Patented June 12, 1951

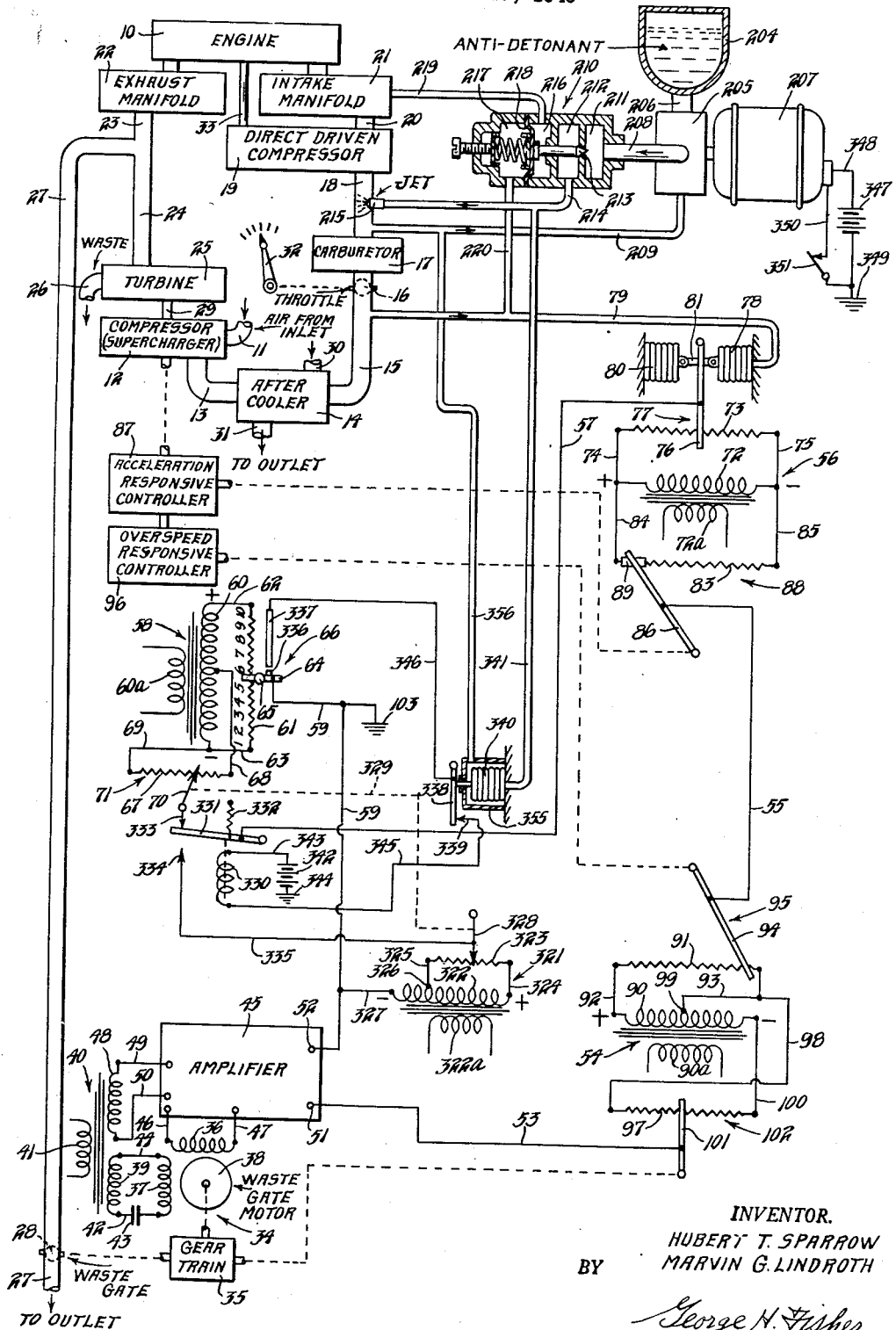

2,556,985

UNITED STATES PATENT OFFICE 2,556,985

CONTROL APPARATUS FOR INTERNAL-COMBUSTION ENGINES

Hubert T. Sparrow and Marvin G. Lindroth, Minneapolis, Minn., assignors to Minneapolis-Honeywell Regulator Company, Minneapolis, Minn., a corporation of Delaware Application December 15, 1945, Serial No. 635,380

12 Claims. (Cl. 123—25)

This invention relates generally to improvements in intake manifold pressure control systems for internal combustion engines, and more particularly to improvements in control systems of this nature for use in connection with injection of an anti-detonant, such as water, for such engines.

As is well known in the art, it is the present custom, particularly in the case of aircraft engines, to provide a means for compressing air and delivering it to the intake manifold whereby manifold pressures much greater than atmospheric pressures may be attained and the power output of the engine greatly increased. For this purpose, there is provided a so-called turbo-supercharger consisting of an air compressor and a gas turbine for operating the same. The turbine is powered by exhaust gases from the engine and the turbine and compressor speeds, and hence the pressure of the air supplied by the compressor to the engine is controlled by an electrical control system which positions a valve varying the effectiveness of the exhaust gases on the turbine. Said control system, in one well known form, embodies a compound electrical network which includes, among others, a control for manually selecting the intake manifold pressures to be maintained and a pressure responsive control which maintains these selected pressures, within close limits, regardless of the varying pressures of the air at the intake of the compressor. In the latter connection it will, of course, be understood that the pressure of the air at the compressor intake may vary widely in the case of an aircraft installation, when the aircraft flies at varying altitudes.

It is further well known that the engine output may be materially increased, when required during heavy load periods, by the admission of an anti-detonant such atomized water to the mixture formed between the compressed air and the fuel admixed therewith by the engine's carburetor. Such admission of a water spray to the combustible mixture has the effect of preventing overheating and detonation, permitting the operation of the engine at higher intake manifold pressures than would otherwise be possible.

Pressure control systems of this nature, embodying an electrical network, are found to be readily disturbed by any sudden changes in the controlled pressure, due to a tendency of the previously mentioned pressure responsive controller to sense such changes and over-control, or in other words, so affect the network as to cause it to call for a pronounced corrective diminution of the pressure. This surging tendency of the control circuit makes it important that, when water injection is used, the admission of the water or other anti-detonant will not so disturb the system as to cause it to surge, or "hunt" as it is called. It is accordingly an important object of our invention to provide an engine induction pressure and anti-detonant injection control system which is stable under all circumstances, and readily controlled by the pilot or engineer having charge of the engine.

Since in aircraft engines particularly it is, of course, impossible to carry water for injection for any great length of time, and it is furthermore not good practice to use water injection except when an emergency increase in power is called for, it follows that some automatic control should be provided to reduce intake manifold pressures when the water supply is cut off for any reason. For example, if the pressure selector or controller is adjusted to a high setting, or one calling for a pressure greater than would be proper without water injection, and the water supply should run out while the selector remained in such position it would be possible to damage the engine before the condition was sensed and the selector retarded to a lower pressure setting. Our present invention, therefore, has as a further important object the provision of a control system embodying a controller responsive to and sensing the injection of the water to the engine, and which automatically adjusts the pressure controlling network to a condition calling for a reduction of pressure when the water supply is used up or otherwise fails. Protection to the engine is thus provided automatically.

Still a further object of our invention is to provide a control system of this nature in which the admission of anti-detonant to the engine is initiated by a manual control at the will of the pilot or engineer having charge of the engine and in which engine induction system pressures are also manually controllable but only so long as anti-detonant is being injected into the engine, the failure of anti-detonant then overriding the manual pressure selector to reduce the pressure to a safe "dry" value.

These and other more detailed and specific objects will be disclosed in the course of the following specification, reference being had to the accompanying drawings, in which:

In the drawing, the single figure is a diagrammatical showing of a complete engine with its intake manifold pressure control system, water injection elements and controls therefor, arranged in accordance with our invention.

Referring now more particularly to the drawing, we show therein an internal combustion engine 10, which may be the engine of an aircraft. Air for supporting combustion in the engine passes from an intake 11 through a compressor 12, a conduit 13, an aftercooler 14, a conduit 15, a throttle 16, a carburetor 17, a conduit 18, a direct driven compressor 19, a conduit 20, and an intake manifold 21 into the engine.

The exhaust gases from the engine issue from an exhaust manifold 22 and are discharged through a duct 23 having a branch 24 leading to a turbine 25. The turbine is provided with an outlet 26 through which the exhaust gases may escape to atmosphere after passing through the turbine. The conduit 23, commonly termed the exhaust stack, also has an outlet 27 to atmosphere, and controlling the flow of exhaust gases from this outlet is a damper or valve 28, known as the waste gate.

The compressor 12 is driven from the turbine 25 through a shaft 29 and the air compressed in this compressor 12 passes through the aftercooler 14, wherein the heat of compression is at least partly removed by passing fresh air from an intake 30 in heat exchanging relation with the compressor discharge air, after which the cooling air is delivered at the outlet 31.

The throttle 16 may be adjusted by the hand control 32, and in the carburetor 17 fuel from a supply (not here shown) is mixed with the air to form a combustible gas.

The compressor 19 is directly driven from the engine by a shaft 33 and is utilized not only as a compressor but also to evenly distribute the mixture of fuel and air to all cylinders of the engine.

The waste gate 28 is driven by a motor 34 through a gear train 35. The motor 34 is of the split phase type, being provided with a pair of field windings 36 and 37 which are spaced 90 electrical degrees apart, and an armature 38. The field winding 37 is supplied with electrical energy from a secondary winding 39 of a transformer 40 having a primary winding 41 which is connected to a suitable source (not shown) of alternating current. The energizing circuit for the winding 37 may be traced from the lower terminal of the transformer winding 39 through a conductor 42, a condenser 43, the field winding 37, and a conductor 44 to the upper terminal of the secondary winding 39.

The flow of electrical energy to the motor field winding 36 is controlled by an electronic amplifier 45 to which the winding is connected by conductors 46 and 47. The amplifier 45 is powered from another secondary winding 48 on the transformer 40, to which the amplifier is connected through conductors 49 and 50.

The amplifier 45 is provided with a pair of input terminals 51 and 52 and operates to supply the field winding 36 of the motor with alternating current the phase of which depends upon the phase of an alternating current signal impressed across these input terminals 51 and 52. Any suitable form of amplifier may be used. An amplifier typical of the type suitable for use in our apparatus is that shown in the patent to Beers, No. 2,020,275. Another example of an amplifier adapted for use in our apparatus is shown in Fig. 1 of the co-pending application of Albert P. Upton, Serial No. 437,561, filed April 3, 1942, now Patent Number 2,423,534, granted July 8, 1947.

It will be evident that if the motor field winding 36 is supplied with alternating current which leads the current in the other field winding 37 by ninety electrical degrees the motor will rotate in one direction, whereas if the current in winding 36 lags the current in winding 37 by this amount, the motor will rotate in the opposite direction.

The phase of the signal applied to the amplifier input terminals 51 and 52 is determined by the electrical conditions existing in a compound network which consists of three main networks normally all connected in series. The circuit between the amplifier input terminals may be traced from the terminal 51 through a conductor 53, a first electrical network 54, a conductor 55, a second electrical network 56, a conductor 57, a third electrical network 58, and a conductor 59 back to input terminal 52. In the conductor 57 there is placed a relay which normally completes the circuit between the networks 56 and 58. The purpose of this relay will be later described but in this initial discussion of the pressure control system, it will be ignored.

The network 58 comprises a transformer having a secondary winding 60 and primary winding $60^a$. A slidewire resistance 61 is connected across the terminals of the secondary winding 60 by conductors 62 and 63, and cooperating with the resistance is a slider 64 to which conductor 59 is connected. The slider 64 may be adjusted along the resistance by a manually operative control knob 65 and these elements constitute a pressure selector indicated generally at 66 which, as will presently appear, may be adjusted by the pilot or engineer to select any desired intake manifold pressure.

Another slidewire resistance 67 is connected across the lower half of the secondary winding 60 by a conductor 68 leading to a center tap on the winding and by a conductor 69 connected to the lower terminal of the winding. A manually adjustable slider 70 cooperates with the resistance 67 and together therewith forms a calibrating potentiometer 71. The conductor 57 is connected to this slider.

The network 56 comprises a transformer having a secondary winding 72 and primary winding $72^a$ and a slidewire resistance 73 is connected across the terminals of the secondary winding by conductors 74 and 75. A slider 76 cooperates with the resistance 73 to form a pressure responsive control potentiometer indicated generally at 77. For this purpose the slider 76 is positioned in accordance with the induction system pressure by means of a bellows 78 to the interior of which is conducted air from the induction system of the engine through a duct 79. Opposing the bellows 78 is an evacuated bellows 80 and the two are connected by a link 81 which actuates the slider 76. The bellows 80 compensates the controller for variations in ambient air pressures in a well known manner, and as here shown, it will be apparent that a rise in induction system air pressure will move the slider 76 to the left along the resistance 73, and vice versa. The exact point at which the duct 79 is connected to the engine's induction system is immaterial to the present invention but it is here shown as connected to conduit 15 upstream from the throttle 16.

A second slidewire resistance 83 is also connected across the winding 72 by means of conductors 84 and 85, and cooperating with resistance 83 is a slider 86 which is positioned in accordance with variations in the rate of acceleration of the turbine 25. For this purpose there is diagrammatically shown a control device 87 connected to the operating shaft of the turbine, and the resistance 83 and slider 86 together from an acceleration compensating controller 88. It may here be noted that the slider 86 will normally remain in the position shown upon a conductive dead spot 89 at the left-hand end of resistance 83, but will swing to the right upon the acceleration of the turbine beyond a safe value. The dead spot 89 is provided so that minor accelerations of the turbine will have no effect upon the system.

The network 54 includes a transformer having a secondary winding 90 and primary winding 90a and a slidewire resistance 91 is connected by conductor 92 to one terminal of this winding and by conductor 93 to an intermediate point or tap 99 on the winding. A slider 94 cooperates with the resistance 91 and is connected to the slider 86 by the aforesaid conductor 55. The slider 94 and resistance 91 cooperate to form a velocity responsive compensating controller 95, and the slider 94 is positioned by a velocity responsive control device 96 connected to and operated by the turbine 25. The slider 94 is moved over the resistance 91 by the control device 96 in accordance with the velocity of the turbine.

The network 54 also includes a slidewire resistance 97, the left-hand terminal of which is connected by a conductor 98 to the conductor 93 leading to the intermediate tap 99 on winding 90 and the right-hand terminal of which is connected by a conductor 100 to the right-hand terminal of winding 90. A slider 101 to which the aforesaid conductor 53 is connected cooperates with the resistance 97 to form a follow-up potentiometer 102. The slider 101 is moved along the resistance 97 by a connection to the gear train 35, and under control of the motor 34, the slider movement being thus concurrent with that of the waste gate 28.

The foregoing networks and connections are similar in all essential respects to those used in the pressure control system disclosed in the patent of Daniel G. Taylor, No. 2,388,350, issued November 6, 1945. Reference to this patent is invited for a thorough discussion of the operation of such systems and the description herein will be only so complete as to make clear the operation in connection with the improvements constituting the present invention.

All of the secondary windings 60, 72, and 90 are either on the same transformer, which may be that shown at 40, or on one or more separate transformers as here shown, the primaries of which are connected to the same alternating current source as is the primary 41 of transformer 40. Therefore, the alternating potentials at the respective terminals of these transformer windings have at all times a fixed phase relationship with each other. The signal potential impressed across the amplifier input terminals 51 and 52 will thus be the algebraic sum of a number of potentials developed in the three networks 54, 56, and 58.

For convenience in description, the potential conditions existing during a half cycle at which the transformer windings have the polarities indicated by the legends will be considered. For a reference potential, the conductor 59 is indicated as grounded, or of zero potential to ground as shown at 103.

In the network 58, the slider 64 is shown as at approximately a mid-point along the resistance 61 whereas the slider 70 in the position shown may be assumed to be at a negative potential with respect to slider 64. The network 58 may thus be said to introduce a signal potential into the series circuit connecting the amplifier input terminals of a polarity such that the conductor 57 is negative with respect to the grounded conductor 59.

Turning now to the network 56 it will be seen that with the sliders 76 and 86 in the positions shown, this network introduces into the series circuit a potential equal to the potential of slider 76 with respect to the left terminal of transformer winding 73.

This potential is then such that slider 86 and conductor 55 are positive with respect to slider 77. The potential of conductor 55 with respect to ground depends upon the relative magnitudes of the respectively negative and positive potentials produced by the networks 58 and 56. For convenience, at this point, this potential may be considered to be such that conductor 55 is positive with respect to grounded conductor 59.

Considering finally the network 54, it will be evident that since slider 94 is at the right-hand extremity of the resistance 91, the conductor 93 leading to the tap 99 on the tarnsformer winding 90 is at the same (positive) potential with respect to ground as is the conductor 55, leading to this network. The resistance 97 being connected between this point, or conductor 93, and the now negative terminal of the winding 90, thus is negative with respect to conductor 93 by an amount dependent upon the value of the resistance between slider 101 and conductor 98. Thus network 54 introduces a negative potential into the series circuit and under a condition of balance the magnitude of this negative potential is equal to and opposes the positive potental produced by the algebraic sum of the effects of networks 56 and 58.

Under such conditions the amplifier input terminal 51 is at the same ground potential as is terminal 52, no signal is then impressed in the amplifier, and the amplifier supplies no current to the motor field winding 36. The waste gate 28 then remains stationary. However, should any of the sliders be shifted from their positions at which the compound network is balanced, a signal potential will develop across the amplifier input terminals resulting in the supply of an operating current to the motor field winding 36 such as to cause the motor 34 to rotate and change the position of the waste gate.

For example, consider the result of a rise in pressure in the engine induction system. The bellows 78 is then expanded and the slider 76 is moved to the left along the resistance 73, reducing the magnitude of the positive potential introduced by the network 56 into the series circuit. This positive potential is thus made insufficient to completely cancel or oppose the sum of the negative potentials introduced by the networks 58 and 54 and a signal potential appears at the amplifier input terminal 51 such that this terminal is negative with respect to terminal 52. It is assumed that the amplifier and motor are properly connected to respond to a signal of this polarity or phase so that the amplifier supplies motor field winding 36 with an alternating current potential of the proper phase relation to cause the motor to rotate in proper direction to move the waste gate 28 toward open position. At the same time, the slider 101 is moved toward the left along the resistance 97.

The opening movement of the waste gate 28 reduces the pressure of the exhaust gases exerted on the turbine 25, causes the speed thereof to decrease, and reduces the compression ratio of the compressor 12. The pressure of the air supplied to the engine 10, and to bellows 78 is now reduced and the slider 76 begins to work back to the right along resistance 73. The movement of the slider 101 to the left along resistance 97, coincident with the opening movement of the waste gate 28, introduces a balancing positive potential into the series network and this movement will continue until this balancing potential is exactly equalled by the potential introduced by operation of the controller 78 and the series network is again balanced. The motor 34 then stops, leaving the waste gate in the newly selected position.

In similar manner a decrease in discharge pressure of the supercharger 12 will introduce an opposite potential by action of the controller 78, causing a signal of opposite phase to be applied to the amplifier which then runs the motor in the opposite direction to close the waste gate and boost the pressure. Such operation is accompanied by a rebalancing movement of the slider 101 to bring the network to balance again.

The same actions occur upon the movement of any of the other sliders 64, 70, 86 or 94, and it will be evident without further description herein that, when properly functioning and energized, the system will permit the selection of any desired discharge pressure for the supercharger under control of controller 66 and will maintain such pressure by means of controller 78.

The function of the controllers 88 and 95 will likewise be apparent, the former serving to introduce a potential into the network such as to open the waste gate 28 when the turbine accelerates at too rapid a rate, while the latter causes the same effect if the turbine exceeds a maximum safe velocity.

The foregoing is the normal manner of operation of the system, without the use of water injection into the engine. For water injection there is provided a tank 204 for containing the water, or whatever liquid is used. By way of example, the anti-detonant will be referred to hereinafter as water although other fluid anti-detonants could be used. To this tank 204 there is connected a pump 205 by a supply pipe 206. The pump 205 is driven by an electric motor 207 and operates in a well known manner to deliver water from the tank through a discharge pipe 208 at a predetermined pressure above a reference pressure supplied to the pump. As here shown, the reference pressure is supplied through a duct 209 leading to the conduit 18 which connects the carburetor 17 to the direct driven compressor 19. As a result, air, at so-called lower carburetor deck pressure, is supplied to the pump and the pump delivers the water at a predetermined greater pressure, so that it may be atomized in the air at the downstream side of the carburetor.

The water from the pump 205 enters a metering valve unit 210 which comprises a housing having an inlet chamber 211 and outlet chamber 212 separated by a partition wall in which is located a needle valve 213. Water enters the inlet chamber through the pipe 208 and, under control of the valve 213, enters outlet chamber 212 from which it flows through a pipe 214 leading to a jet or nozzle 215 located in the conduit 18 downstream from the carburetor. The valve 213 is positioned in accordance with the differential between the absolute intake manifold pressure and the carburetor inlet pressure as here shown. For this purpose, the valve housing has two separate pressure chambers 216 and 217 separated by a diaphragm 218 and to the chamber 216 there is led air at intake manifold pressure by a duct 219. A duct 220 leads air at carburetor inlet pressure to the chamber 217. The valve 213 is connected to the diaphragm 218 and if the pressure in the intake manifold 21 exceeds that at the carburetor intake by a predetermined difference, the diaphragm will flex and draw the valve open, the amount of this movement being determined by the pressure differential. Thus the water is metered to the jet 215 in accordance with this pressure differential, which is itself a measure of the engine power, and thus regulates the flow of water in accordance with the ability of the engine to utilize it to advantage. The diaphragm 218 is adjustably spring loaded in a conventional manner to select the pressure differential required to actuate the valve.

It will be apparent that, as thus far described, the system can in operation cause damage to the engine should the water supply be interrupted for any reason while the engine is operating with the pressure selector 66 set at a high value. In other words, if the selector 66 is adjusted to call for and obtain a high intake manifold pressure, as it would normally be when using water, then a water failure would leave the engine "dry" and overheating and detonation would be likely until the manifold pressure was reduced by operation of the selector 66.

To render the system safe under all conditions, we provide an auxiliary, fixed signal network 321 which is automatically substituted for the network 58 when the water supply fails as will now be described.

The network 321 comprises a transformer having a secondary winding 322 and primary winding 322a, and the latter is connected to the same source of alternating current supply as the transformer primaries of the other networks. A slide-wire resistance 323 is connected by a conductor 324 to one terminal of the secondary winding 322 and by another conductor 325 to a tap 326 on said winding. The remaining terminal of the secondary winding 322 is connected by a conductor 327 to the grounded conductor 59 leading to the amplifier input terminal 52. A slider 328 cooperates with the resistance 323 and may for convenience sake be mechanically ganged or connected, as indicated by the broken line 329, to the slider 70 of the calibrating potentiometer 71.

A relay is provided comprising a magnet coil 330 which is adapted when energized to actuate a movable contact 331 downwardly from the position shown in the drawing and at which position the contact may be held by a spring 332 or other means. In the normal or deenergized position of the relay, the movable contact 331 thus electrically engages a fixed contact 333 which is connected to the calibrating potentiometer slider 70 and, the movable contact 331 being connected to the conductor 57, it will be apparent that the network 58 is, as previously stated, normally in the circuit. On the other hand, when the relay coil 330 is energized the movable contact 331 is moved out of engagement with the fixed contact 333 into electrical engagement with another fixed contact 334 to which is connected a conductor 335 leading to the slider 328 of the network 321. Thus as the relay is energized the bridge 321 is substituted for the bridge 58 in the compound network controlling the amplifier 45, and through it, the engine intake manifold pressure.

This relay is controlled by two separate series-connected controls. The first of these is the slider 64 of the manifold pressure selector 66. This slider 64 is grounded, as stated, by its connection to conductor 59, and the slider carries a contact brush or wiper 336 which is adapted to electrically engage a contact bar 337 positioned along the resistance 61 or in the path of the slider during the advance or upper part of its movement. As here shown, movement of the slider 64 from graduations "1" to "6," or through what may be termed its dry range, will have no effect on the relay while movement of the slider beyond position "6" and thence toward position "10," or through its wet range, will cause the brush 336 to engage and ground the bar 337. It will be understood, then, that on the pressure selector 66 is moved in and through its most advanced ranges, calling for manifold pressures of a high order normally requiring water injection, the relay control switch formed by the brush 336 and bar 337 will be closed.

The second relay control comprises a normally closed, water responsive switch here shown as including a movable contact 338, a fixed contact 339, and a bellows 340 connected to and actuating the movable contact. The bellows is located within a housing 355 to which is connected a duct 356 connecting with pipe 209 which, it will be recalled, connects with the conduit 18 which, in turn, connects the carburetor 17 to the direct driven compressor 19. As a result, a fuel mixture at the lower carburetor deck pressure is supplied to the housing 355 and opposes the action of bellows 340. The switch contacts 338 and 339 are thus actuated in accordance with the differential between the water pressure and the lower carburetor deck pressure. Whenever there is no water flowing, the switch contacts 338 and 339 are closed. As soon as water pressure is built up to establish a flow of water to the jet 215, the bellows 340 is expanded and moves the contact 338 out of engagement with fixed contact 339. This switch is thus responsive to water pressure but it is, of course, to be understood that a water flow switch of any known form could be substituted for this pressure switch if desired.

The relay coil 330 may be powered by any suitable means, such as a battery indicated at 342, and as shown one terminal of the battery is connected by a conductor 343 to one terminal of the coil. The other terminal of the battery is grounded as indicated at 344, or is in effect connected to the conductor 59 leading to slider 64. The remaining terminal of the relay coil 330 is connected by a conductor 345 to the fixed contact 339 and the relay control circuit is completed by a conductor 346 connecting the fixed contact 338 to the contact bar 337.

The water pump motor 207 may be powered by a battery 347 one terminal of which is connected by a conductor 348 to the motor and the other terminal of which is grounded as indicated at 349. Another conductor 350 leads from the motor to a manual control switch 351 which, in turn, is connected to ground at 349. While we have shown separate batteries 342 and 347 in order to simplify the circuits, it is to be understood that normally the usual ship's battery would be employed for both circuits.

*Operation of water injection control*

To initiate the injection of water into the engine, the water pump control switch 351 is first closed so that the motor circuit will be closed and the pump 205 started. The motor circuit may be traced from the upper terminal of the battery 347, through the conductor 348, the motor, conductor 350, manual switch 351 and back to the lower terminal of battery 347. Assuming the metering valve 210 to now permit it, the water will be admitted to the engine, atomized by the jet 215, and the engine benefited as previously described.

The starting of the pump motor will also cause the water pressure to build up within bellows 340 and cause contacts 338 and 339 to be separated. Were it not for this separation of switch contacts 338 and 339, a circuit would be established to relay coil 330 as soon as the pressure selector slider was moved to its higher range, above point "6." The energization of relay 330 is prevented, however, by starting the water pump motor before the slider is moved to its higher range. As long as relay coil 330 remains deenergized, the operation of the control system for the waste gate 28 is the same as described above and the pressure selecting bridge 58 has full control no matter to how advanced a position slider 64 is moved.

It will be noted that the movement of slider 64 from the range in which water injection is not maintained to the range in which water injection is necessary is accomplished without any sudden or abrupt change in the system as long as the water flow is established before the slider is moved to the advanced range of positions.

If the water supply should fail for any reason, the bellows 340 will respond to the drop in water pressure or flow and cause the switch contacts 338 and 339 to be closed. The closure of these contacts with the slider 64 in the advanced range of positions will cause a circuit to be established to relay coil 330 as follows: from the upper terminal of battery 342 through conductor 343, relay coil 330, conductor 345, switch contacts 339 and 338, conductor 346, bar 337, brush 336, slider 64, and ground connections 103 and 344 back to the lower terminal of the battery. The energization of relay coil 330 will cause movement of switch blade 331 from engagement with contact 333 into engagement with contact 334. When this happens, the circuit between the series connected bridges 54 and 56 and bridge 58 will be interrupted and the fixed bridge 321 will be substituted for bridge 58. The conductor 57 extending from bridge 56 will now be connected through switch blade 331, contact 334, and conductor 335 to the slider 328 of the fixed bridge 321. The pressure which now will be maintained will be one which is unaffected by the position of slider 64 and which will generally correspond to the pressure maintained by bridge 58 when slider 64 is at position "6." As previously noted, slider 328 is mechanically connected to the slider 70 of the calibrating potentiometer 71. Thus, the voltage introduced by bridge 321 is affected by an adjustment of the calibrating potentiometer but it is not so affected by the setting of the slider 64. Thus no matter how high the pressure called for by the network 58, the pressure actually developed upon the loss of water pressure will be immediately dropped to a value corresponding to that at position "6," which value is safe for operation without water. Positive protection for the engine is thus secured automatically and without attention of the engineer.

It will be noted that, in furtherance of one important object of our invention, the initiation of water injection to the engine is accomplished without causing surges in the intake manifold pressure such as to cause the control system to hunt or become unstable. By proper adjustment of the network 321, its introduction into the pressure control system momentarily while water pressure is being developed as previously described will have little or no effect, and its removal from the circuit and restoration of control of the pressure to the manually variable selector 66 will allow the manifold pressure to be increased at will without instability.

It is believed at this time to be most practical to extend the range of the pressure selector 66 beyond that normally used when water injection is not provided for the engine. In other words, the adjustment of selector 66 from positions "1" to "6" might call for the normal range of manifold pressures for "dry" operation of the engine, while the advance ranges "6" through "10" would call for higher pressures useful only with water injection. Thus at the option of the person in control, water injection is brought on by closing manual switch 351 and then advancing selector 66 to the higher ranges, all without any sudden changes in manifold pressures, or changes of such magnitude as to cause a hunting condition in the control system.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. Control apparatus for controlling the pressure of air supplied to the fuel system of an internal combustion engine in which means are provided for injecting an anti-detonant into the fuel system when abnormal power is needed, said apparatus comprising an adjustable means for preselecting the pressure of air and having a wide range of uninterrupted adjustment including a range of pressures sufficiently high that operation of the engine without injection of an anti-detonant would cause injury to the engine, means responsive to the presence of the anti-detonant effective in the absence of the anti-detonant to limit said range of adjustment, and means for initiating operation of the injecting means regardless of the position of said adjustable means.

2. Control apparatus for adjusting the intake manifold pressure of an internal combustion engine and for injecting an anti-detonant into the engine, comprising adjustable means for selecting the pressure, said means having a first range of adjustment effective when the anti-detonant is not being injected into the engine and a further range calling for higher pressures when the anti-detonant is being used, means responsive to the injection of the anti-detonant into the engine and operative when the supply of anti-detonant fails to override the said adjustable means if in its further range for said higher pressures, and means for initiating operation of said injection means regardless of whether said adjustable means is in its first or its further range of adjustment.

3. In intake manifold air pressure control apparatus for an engine having apparatus for injecting a fluid anti-detonant into the engine to prevent detonation therein at high manifold pressures, the combination comprising, an electrical control system for the manifold pressure and including a manually adjustable main pressure selector operative to develop varying electrical potentials calling for various manifold pressures, a separate pressure selector adjusted to develop a predetermined fixed electrical potential to call for manifold pressures of a limited maximum value safe for operation of the engine when injection of the anti-detonant is not in use, and control means responsive to the pressure of the anti-detonant being delivered to the engine and in the absence thereof operative to substitute the said separate pressure selector for the main pressure selector when said main pressure selector is adjusted to call for manifold pressures too great for operation of the engine without the anti-detonant.

4. In intake manifold air pressure control apparatus for an engine having apparatus for injecting a fluid anti-detonant into the engine to prevent detonation therein at high manifold pressures, the combination comprising, an electrical control system for the manifold pressure and including a manually adjustable main pressure selector operative to develop varying electrical potentials calling for various manifold pressures, a separate pressure selector adjusted to develop a potential such as to call for a manifold pressure of a limited maximum value safe for operation of the engine when injection of the anti-detonant is not in use, control means responsive to the pressure of the anti-detonant being delivered to the engine and in the absence thereof operative to substitute the said separate pressure selector for the main pressure selector, and means operative by the main pressure selector for rendering said control means effective to make said substitutions only while the main pressure selector is adjusted to call for air pressures above a predetermined magnitude.

5. In intake manifold air pressure control apparatus for an engine having apparatus for injecting an anti-detonant into the engine to prevent detonation therein at high manifold pressures, the combination comprising, an electrical control system for the manifold pressure and including a compound electrical network having a network manually variable to develop electrical potentials calling for various air pressures and another network developing a fixed electrical potential calling for air pressure less than said variable network in its higher ranges of adjustment, and means responsive to the presence or absence of the injection of said anti-detonant to the engine for substituting one of said networks for the other in the said compound network.

6. In control apparatus for controlling the pressure of the air delivered to the intake manifold of an engine having apparatus for injecting a fluid anti-detonant into the engine, the combination comprising, a compound electrical network including a manually variable network for selecting various manifold pressures, a separate network adjusted to select a manifold pressure of a maximum value safe for operation of the engine without the anti-detonant, means operative upon the adjustment of the variable network to a condition calling for manifold pressure above said maximum safe value to initiate the injection of the anti-detonant to the engine, and a device responsive to the presence of the anti-detonant flowing to the engine to maintain said variable network in control of the manifold pressure and upon the failure in the flow of the anti-detonant to the engine to transfer the manifold pressure control to said separate network.

7. In control apparatus for controlling the pressure of the air delivered to the intake manifold of an engine having apparatus for injecting a liquid anti-detonant into the engine, the combination comprising, a compound electrical network including a manually variable network for selecting various manifold pressures, a separate network adjusted to select a manifold pressure of a maximum value safe for operation of the engine without the anti-detonant, means operative upon the adjustment of the variable network to a condition calling for manifold pressure above said maximum safe value to initiate the injection of said anti-detonant to the engine, and a switch responsive to the pressure of the anti-detonant operative upon a failure of the pressure of the anti-detonant to transfer the control of the manifold pressure from the variable network to said separate network thereby limiting the magnitude of the pressure of the air to a safe dry value.

8. In a control system for controlling the pressure of the air delivered by a supercharger to the intake manifold of an internal combustion engine having apparatus for injecting a fluid anti-detonant into the engine when operating at high values of pressure requiring injection of the anti-detonant, the combination comprising, an electrical control system having two separate manifold pressure selectors, the first selector being manually adjustable to call for manifold pressures above and below the maximum value safe for dry operation of the engine, the second selector being adjusted to call for a manifold pressure substantially equal to said maximum safe dry value, means operative upon the adjustment of the first selector above the said maximum safe pressure adjustment to initiate the injection of water to the engine, a relay switch for transferring the control of manifold pressure from one selector to the other, and a control switch responsive to the pressure of the anti-detonant and operative to control said relay switch when the first selector is adjusted to call for a manifold pressure above said maximum safe value in the absence of injection of the anti-detonant and to render the first selector ineffective upon the manifold pressure except when the anti-detonant is present and being injected into the engine.

9. In a condition control system, means adapted to change the value of a condition to be controlled, a motor for positioning said condition changing means, means for controlling said motor including a plurality of series connected networks, one of said networks including an impedance variable in accordance with the value of the condition being controlled, a second of said networks including a second impedance manually variable to vary the value of the condition being maintained and a third manually adjustable calibrating impedance, a further network comprising a further calibrating impedance so connected with said previously named calibrating impedance as to have at all times an equivalent impedance value, and means adapted to respond to an abnormal condition during which it is undesirable to have said second impedance in control to substitute said further network for said second network in said series of networks.

10. In a motor control system, a motor to be controlled, means for controlling said motor including a plurality of series connected voltage networks, one of said networks including a main controlling variable impedance, a second of said networks including a second variable impedance having a large range of voltage adjustment and a manually adjustable calibrating impedance having a relatively small range of voltage adjustment, a further network comprising a further calibrating impedance also having a small range of voltage adjustment and so connected with said previously named calibrating impedance as to have at all times an equivalent impedance value, and means responsive to a predetermined condition during which it is desirable to limit the range of adjustment to substitute said further network for said second network in said series of networks.

11. Control apparatus for controlling a pressure which affects the operation of a combustion engine in which means including a source of fluid anti-detonant under pressure are provided for injecting an anti-detonant into the fuel system when abnormal power is needed, comprising in combination, a balanceable electrical network, motor means connected in controlled relation to said network and arranged for controlling an engine pressure, a manually positioned pressure selector connected to adjust the electrical output of said network over a wide range of adjustment including a first range where engine operation without anti-detonant injection is safe and a second range of high pressures where operation without anti-detonant injection is unsafe, and means connected to said network effective upon the presence of anti-detonant injection to cause the electrical output of said network to change in a uniform manner as said selector is moved from said first range into said second range, said last named means limiting the electrical output signal of said network in the absence of anti-detonant injection to a value corresponding to a value within said first range of movement of said selector.

12. Control apparatus for controlling a pressure which affects the operation of a combustion engine in which means including a source of fluid anti-detonant under pressure are provided for injecting an anti-detonant into the fuel system when abnormal power is needed, comprising in combination, a balanceable electrical network, signal producing means including a manually operated pressure selector connected to adjust the electrical output signal of said network over a wide range of adjustment including a first range where operation without anti-detonant injection is safe and a second range where operation without anti-detonant injection is unsafe; motor means connected in controlled relation to said network and arranged for controlling a pressure affecting engine operation; means including said network positioning said motor means in a modulating manner to adjust said pressure by an amount which is proportional to the position of said selector, and anti-detonant responsive means connected to said network to cause said signal producing means to proportionally control said motor means and the engine pressure over said wide range of adjustment of said selector when anti-detonant is present, said responsive means limiting the effective signal from said signal producing means to a value corresponding to an adjustment of said selector within said first range in the absence of anti-detonant.

HUBERT T. SPARROW.
MARVIN G. LINDROTH.

REFERENCES CITED

The following references are of record in the file of this patent:

UNITED STATES PATENTS

| Number | Name | Date |
|---|---|---|
| 2,392,565 | Anderson et al. | Jan. 8, 1946 |